Figure 1:
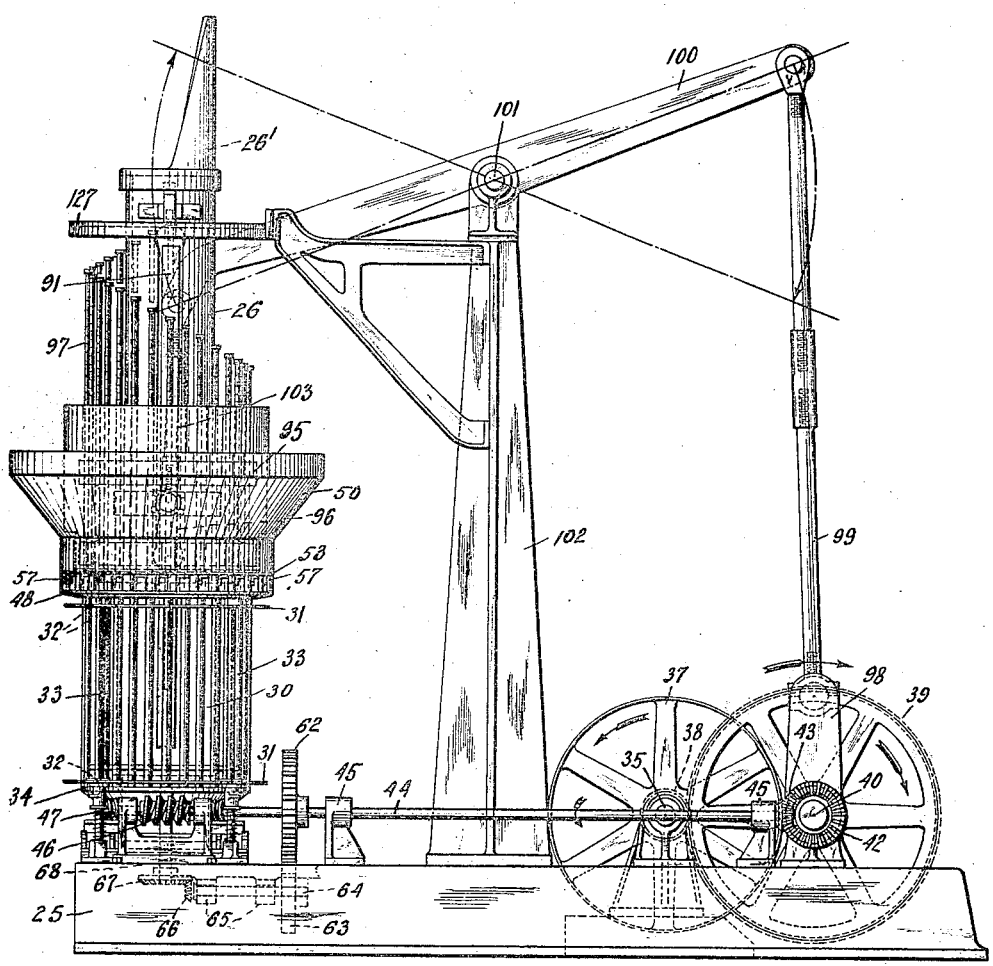

Nov. 2, 1926.  
J. BINDER  
1,605,905  
MACHINE FOR MAKING CORK ARTICLES  
Filed Dec. 1, 1925   13 Sheets-Sheet 1

Nov. 2, 1926.

J. BINDER 1,605,905

MACHINE FOR MAKING CORK ARTICLES

Filed Dec. 1, 1925  13 Sheets-Sheet 2

INVENTOR
J. Binder
BY
Sigmund Herzog
ATTORNEY

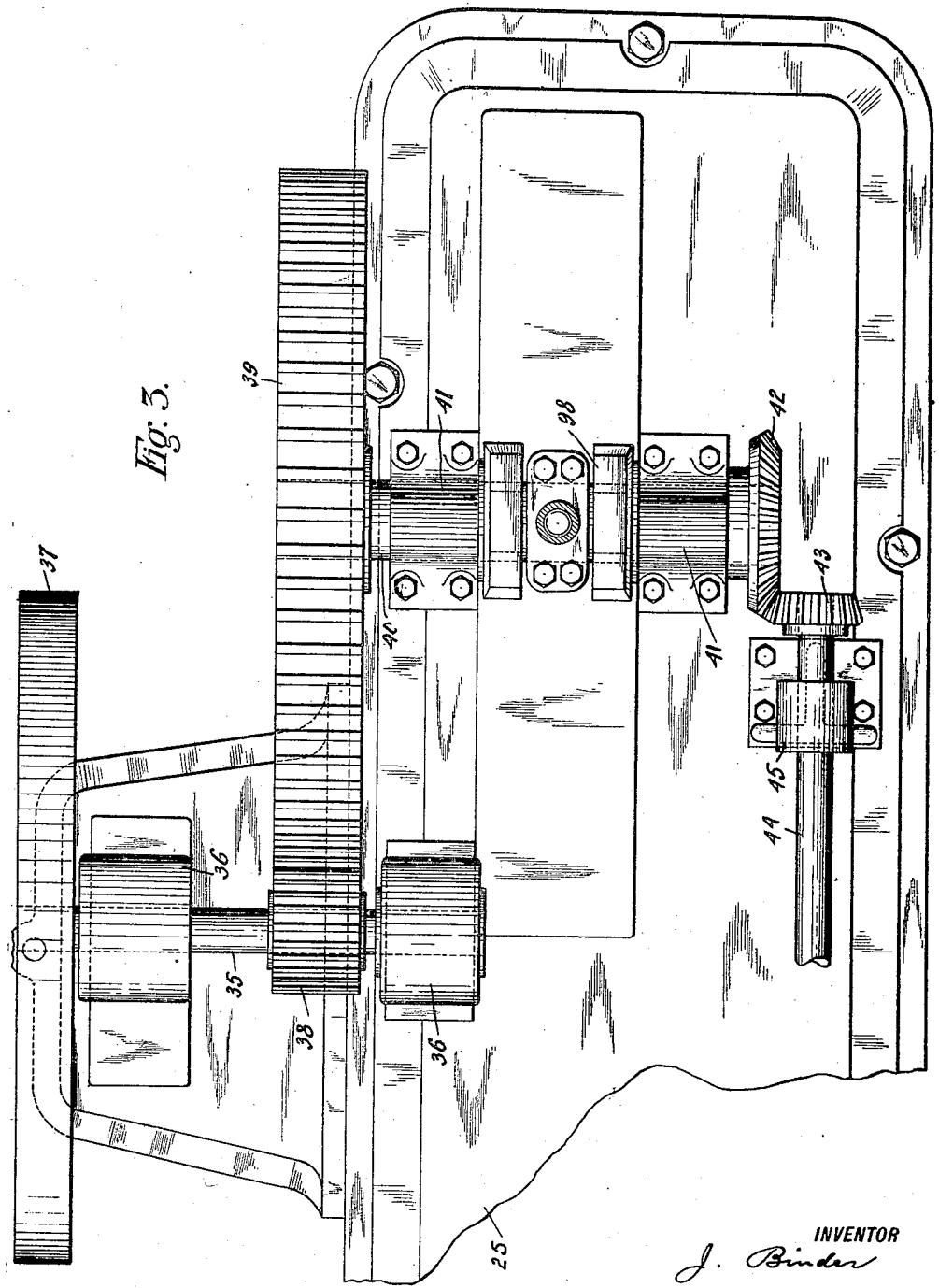

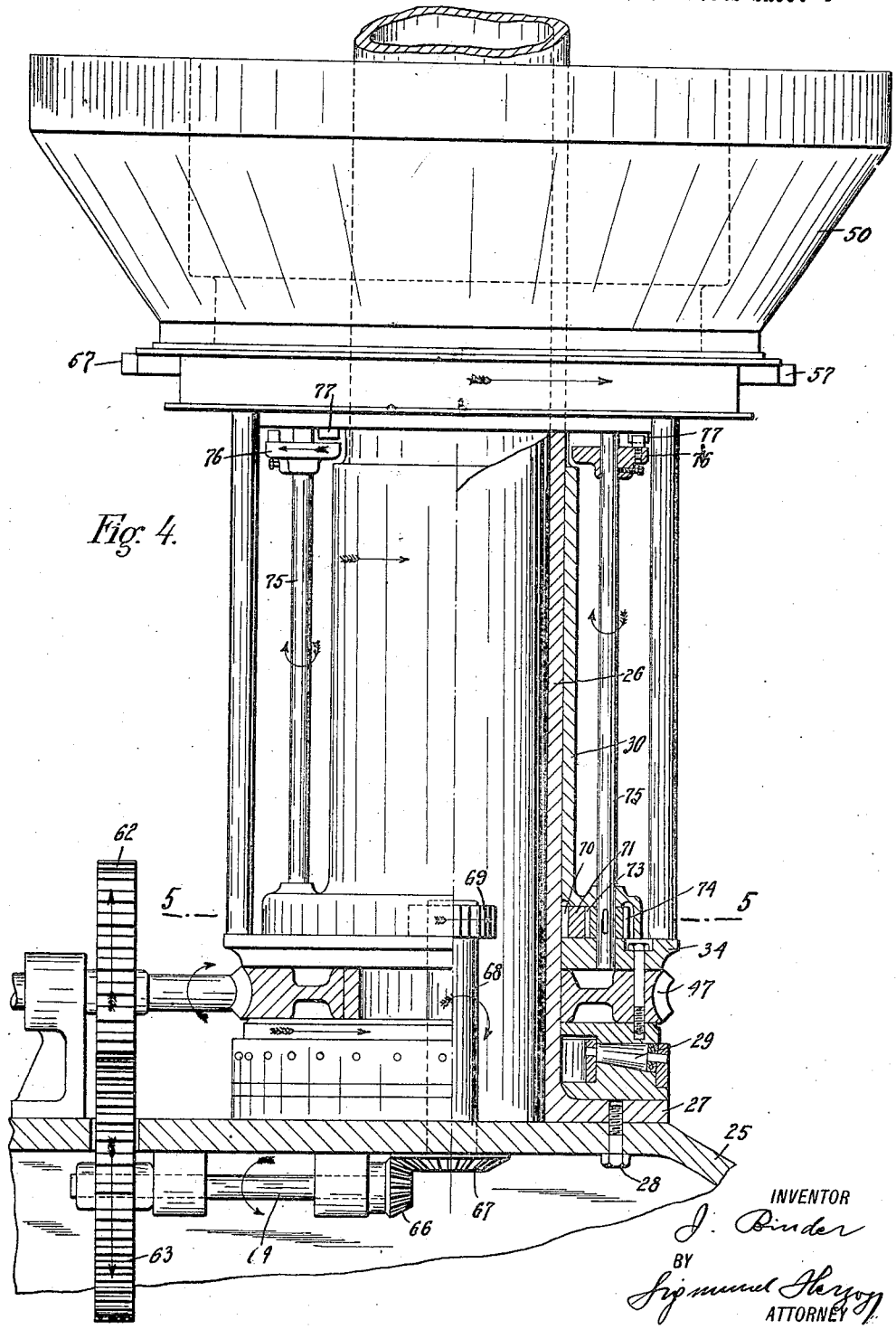

Nov. 2, 1926.  
J. BINDER  
MACHINE FOR MAKING CORK ARTICLES  
Filed Dec. 1, 1925

1,605,905

13 Sheets-Sheet 5

INVENTOR  
J. Binder  
BY  
Sigmund Herzog  
ATTORNEY

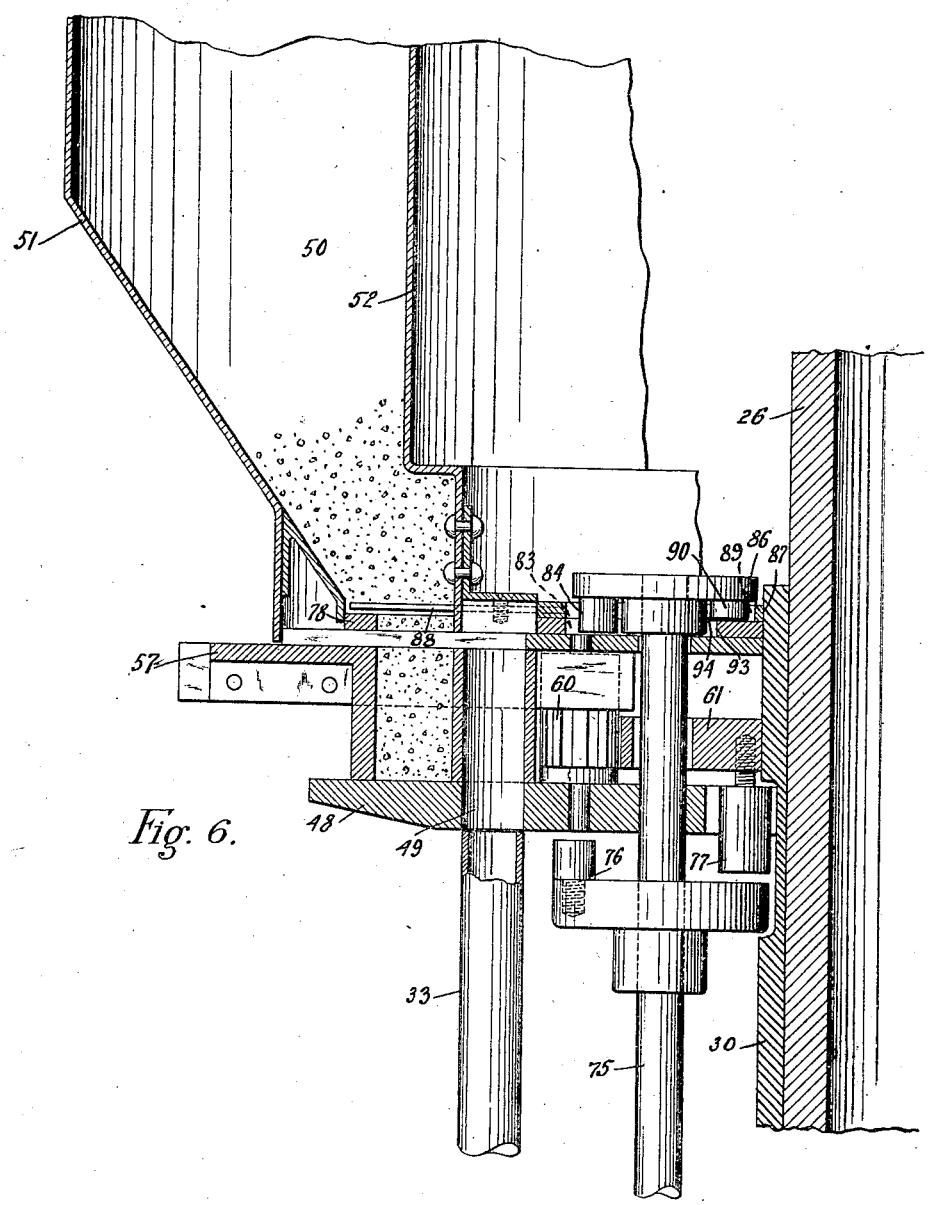

Nov. 2, 1926.

J. BINDER 1,605,905

MACHINE FOR MAKING CORK ARTICLES

Filed Dec. 1, 1925     13 Sheets-Sheet 7

INVENTOR
J. Binder
BY
Sigmund Herzog
ATTORNEY

Nov. 2, 1926.

J. BINDER 1,605,905

MACHINE FOR MAKING CORK ARTICLES

Filed Dec. 1, 1925 13 Sheets-Sheet 8

INVENTOR
J. Binder
BY
Sigmund Herzog
ATTORNEY

Nov. 2, 1926. 1,605,905
J. BINDER
MACHINE FOR MAKING CORK ARTICLES
Filed Dec. 1, 1925  13 Sheets-Sheet 9

INVENTOR
J. Binder
BY
Sigmund Herzog
ATTORNEY

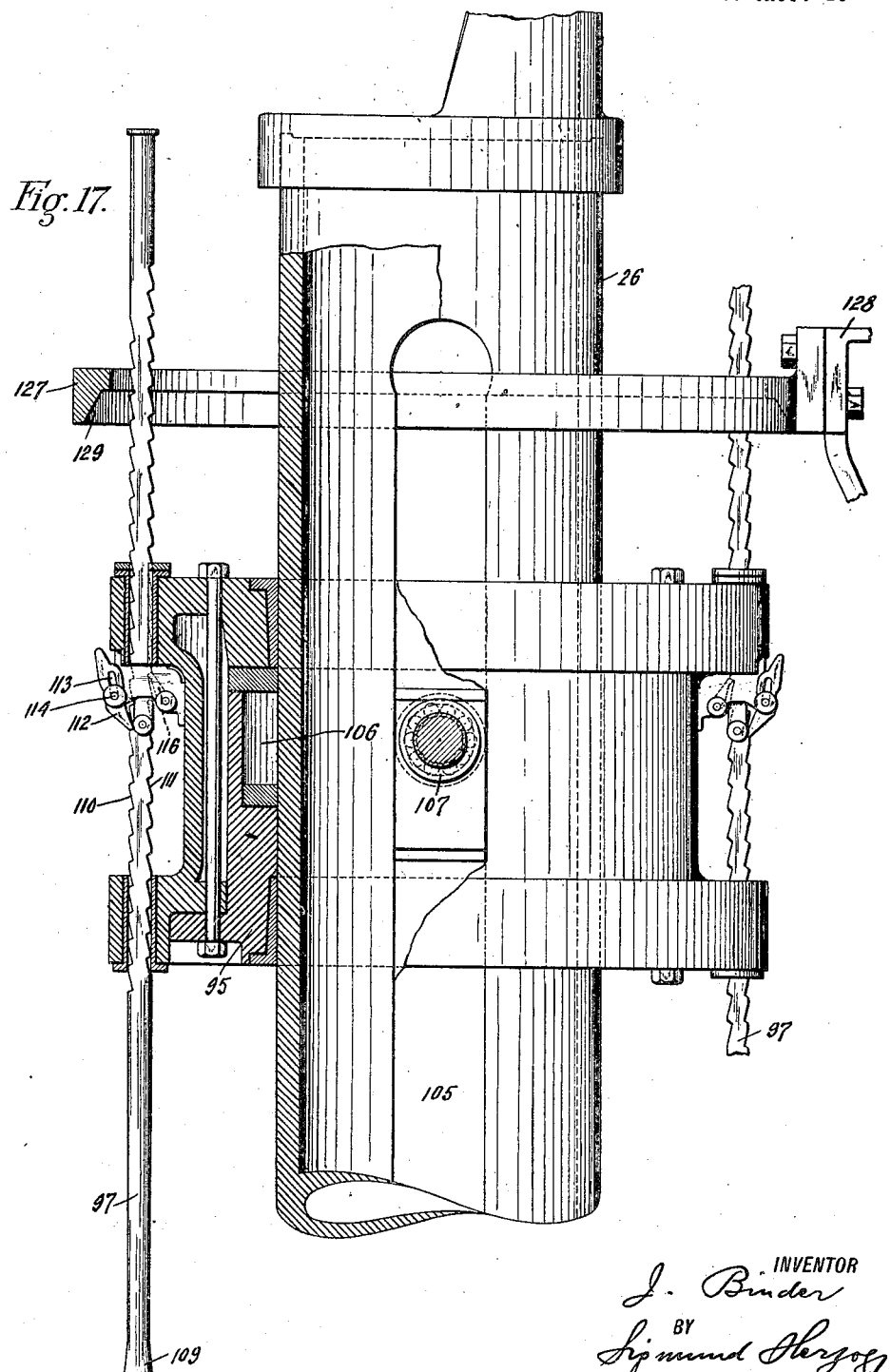

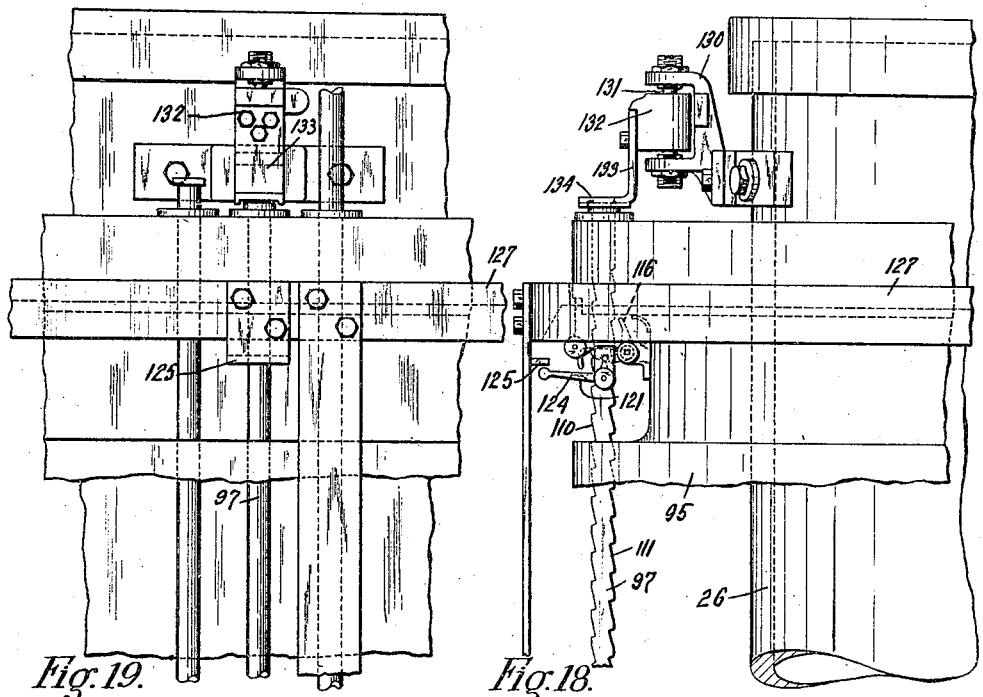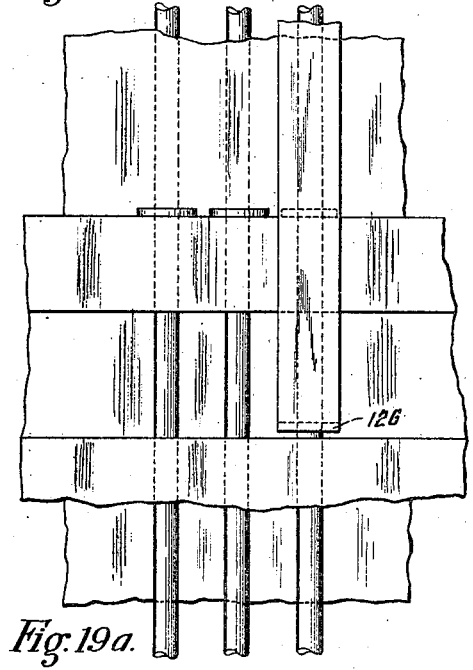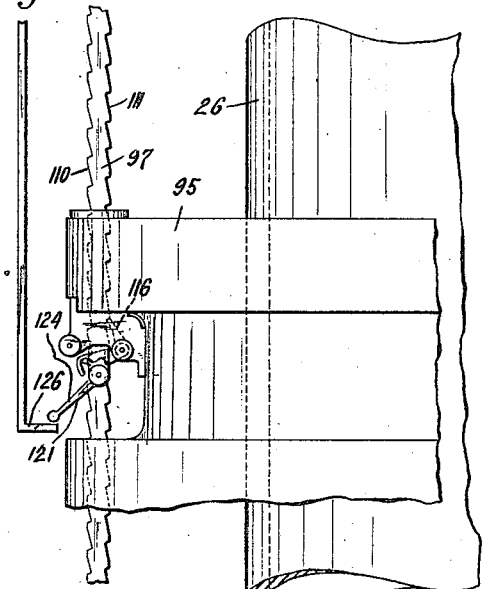

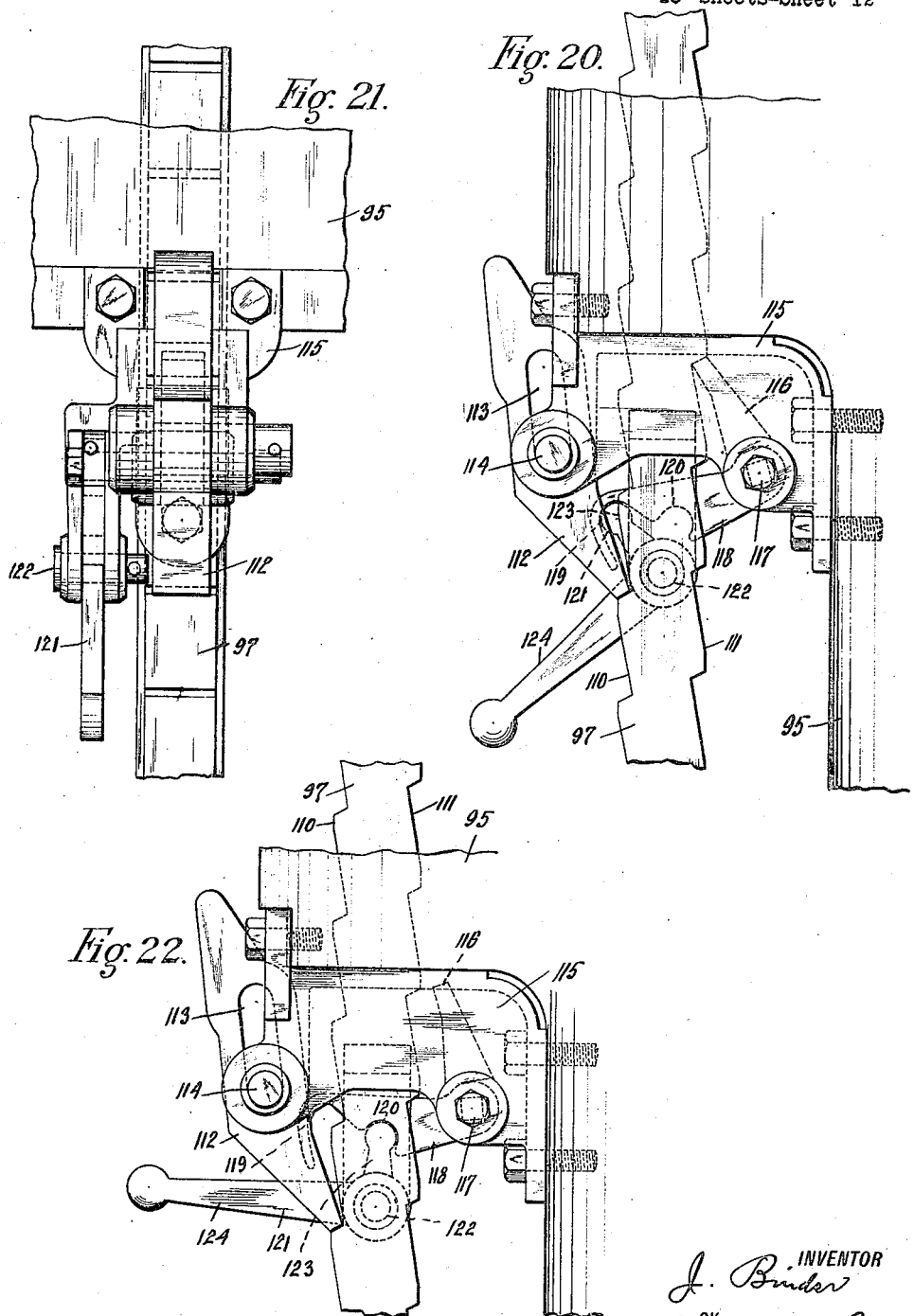

Nov. 2, 1926.
J. BINDER
1,605,905
MACHINE FOR MAKING CORK ARTICLES
Filed Dec. 1, 1925    13 Sheets-Sheet 13
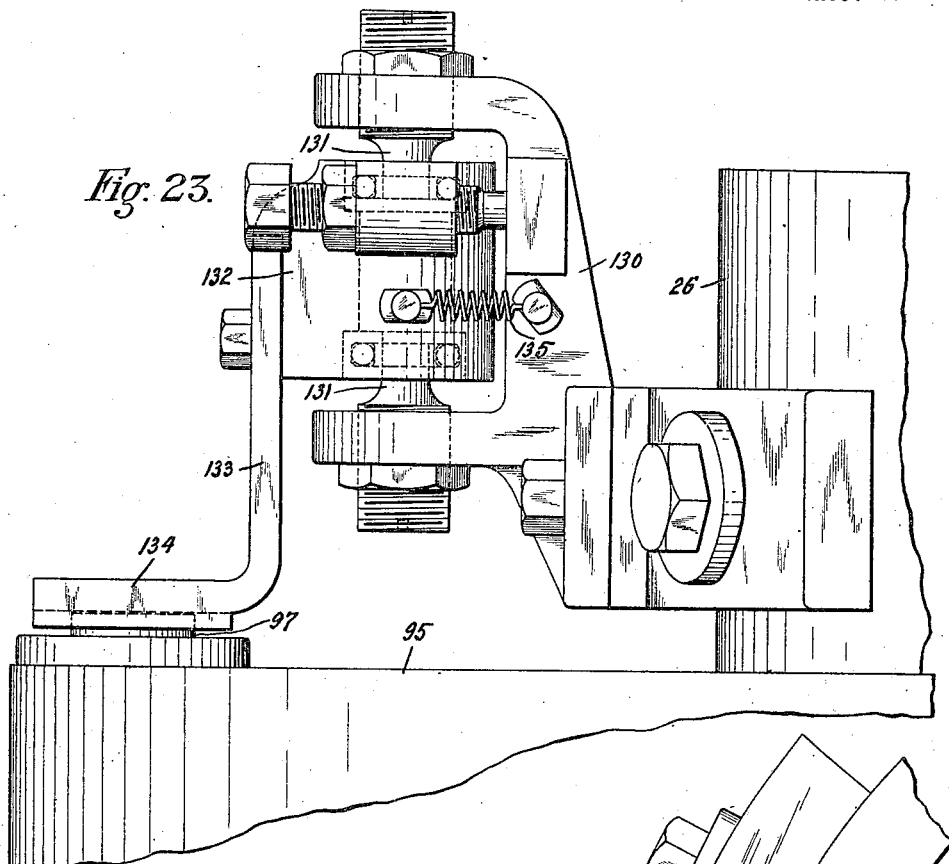
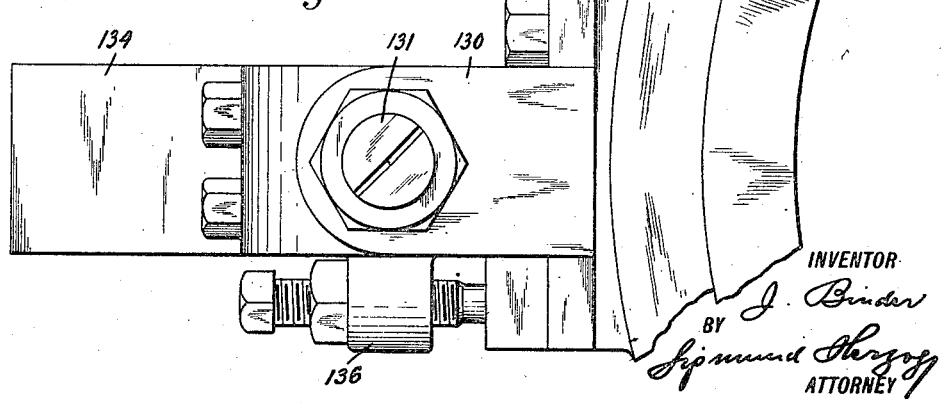

Patented Nov. 2, 1926.

1,605,905

UNITED STATES PATENT OFFICE.

JOHN BINDER, OF NEW HYDE PARK, NEW YORK, ASSIGNOR, BY MESNE ASSIGNMENTS, TO NEW PROCESS CORK CO. INC., OF BROOKLYN, NEW YORK, A CORPORATION OF NEW YORK.

MACHINE FOR MAKING CORK ARTICLES.

Application filed December 1, 1925. Serial No. 72,492.

The present invention relates to a machine for making cork articles. It pertains more particularly to an apparatus for forming rods, especially adapted for use in what is known in the trade as composition cork articles, such as for instance cork disks or other sealing devices used in the bottling and analogous arts, although such rods may be used for various other purposes.

In forming cork rods of the type mentioned, the granulated cork is mixed with a suitable binding agent, which is adapted to coagulate and unite the particles of cork when subjected to a proper degree of heat and pressure, and when cool becomes insoluble and practically unaffected by any degree of heat to which the finished article may be subjected without being destroyed or consumed. The comminuted cork prepared as stated is usually packed into confining tubes or molds, the filled or packed tubes being heated in an oven to the desired degree, the rods so obtained being then removed from the mold and severed into sections of the desired length or thickness to form bottle cap sealing disks, gaskets, packing rings, etc.

In the most modern type of these machines a plurality of tubes or molds receives simultaneously a charge of predetermined volume, which is simultaneously compacted or compressed by a plurality of differentially operative plungers, so as to secure the completion of one rod with each movement of the plungers inwardly of the molds or tubes. In all of these machines, however, the tubes are moved step by step in relation to the plungers. This of course necessitates the employment of accurate aligning means, to bring the molds or tubes in proper relation to the charging means and to the plungers. It is obvious that, inasmuch as these molds or tubes move intermittently, sudden shocks and jars develop in the machine with a consequent wear and often tear, so that in time the elements are thrown out of gear and many of the same must be frequently replaced in order to insure proper operation of the machine and also to prevent breaking of the parts.

The main object of the present invention is to provide a machine of the character mentioned wherein the mold or tube carrying turret and the plungers co-operating with the molds rotate together and continuously, each plunger co-operating with a single tube only, thereby overcoming the difficulties above referred to.

Another object of the invention is to combine with the mold carrying turret and with the plungers a charging mechanism, which moves with the turret and plungers, each element of the charging mechanism co-operating with a single mold only.

A further object of the invention is to provide a single and positive mechanism for causing the plungers to enter the molds to a successively different extent; to provide a simple and novel charging means; and to generally so construct the machine that composition rods are obtained which are uniform throughout their lengths.

With these and other objects in view, which will more fully appear as the nature of the invention is better understood, the same consists in the combination, arrangement and construction of parts hereinafter described, pointed out in the appended claims, and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 2:
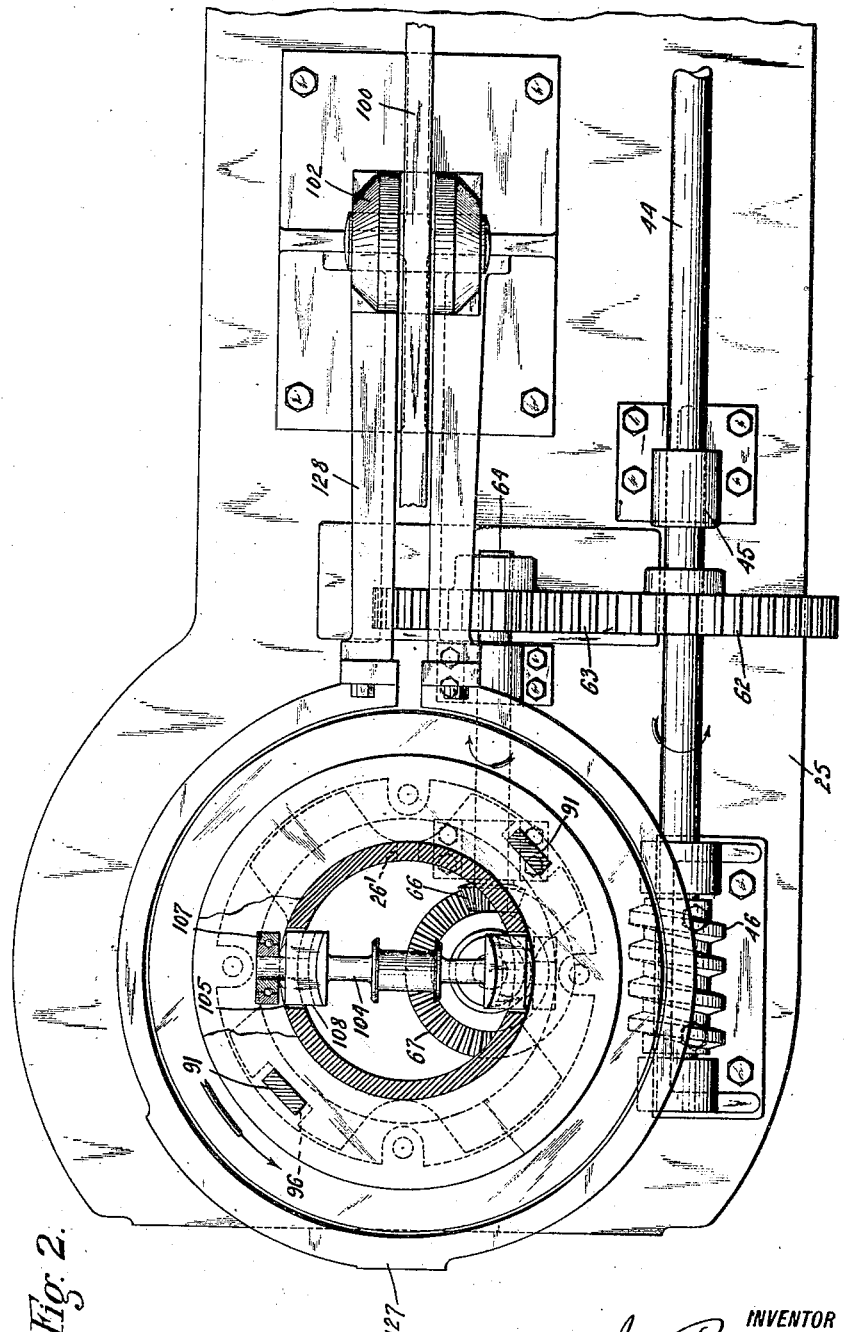
Figure 7:
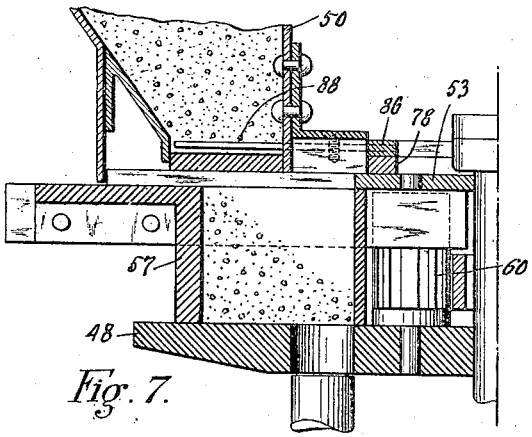
Figure 8:
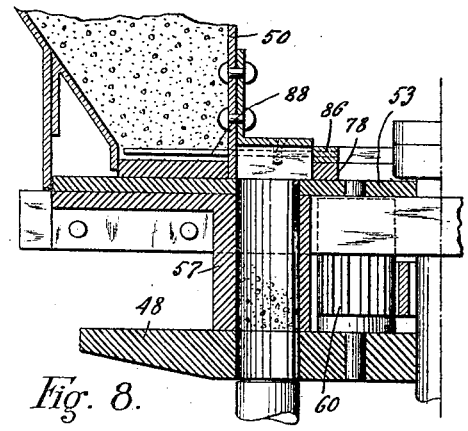
Figure 5:
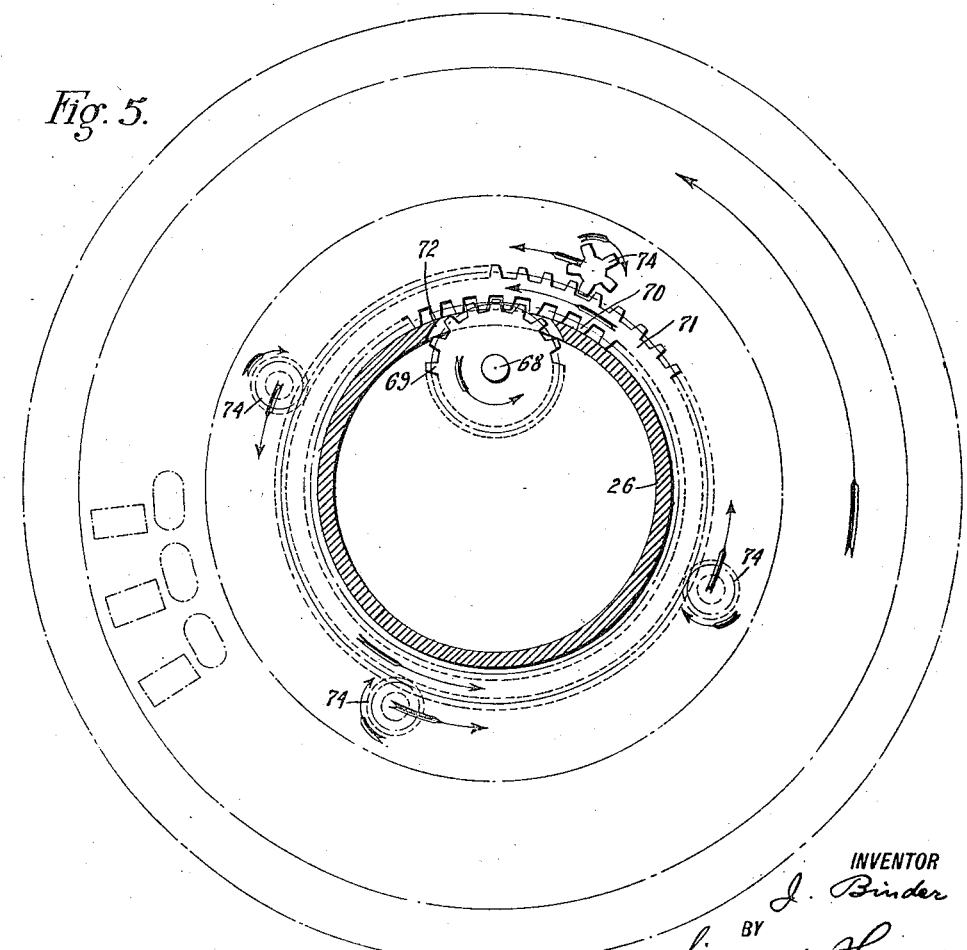
Figure 9:
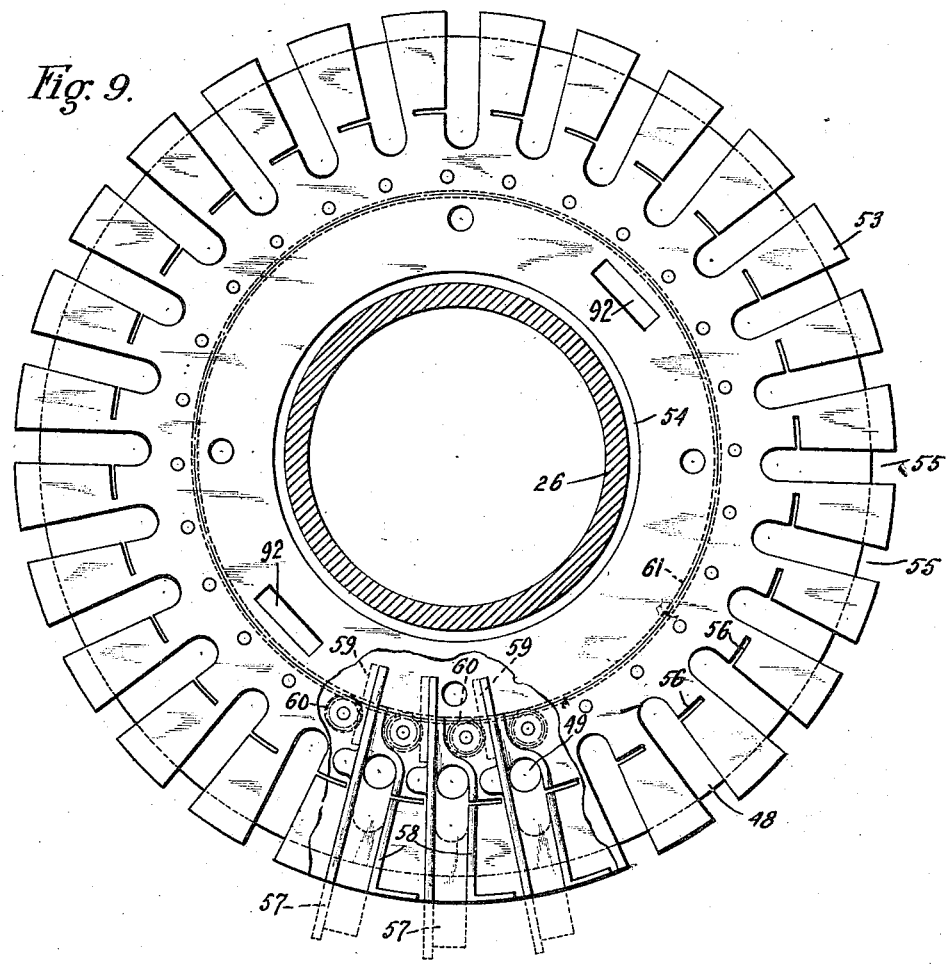
Figure 10:
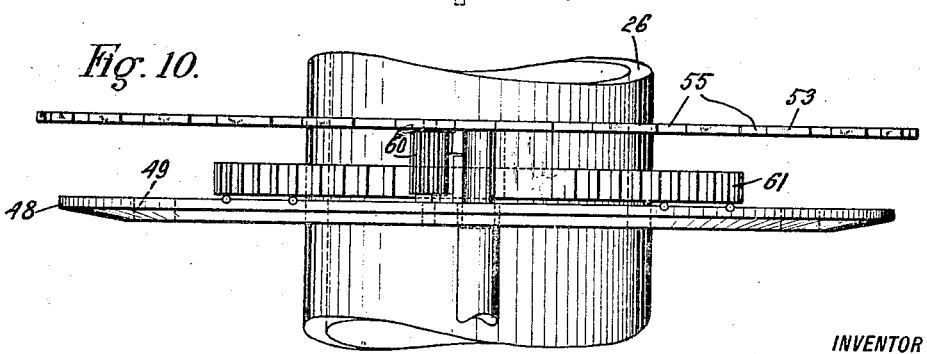
Figure 11:
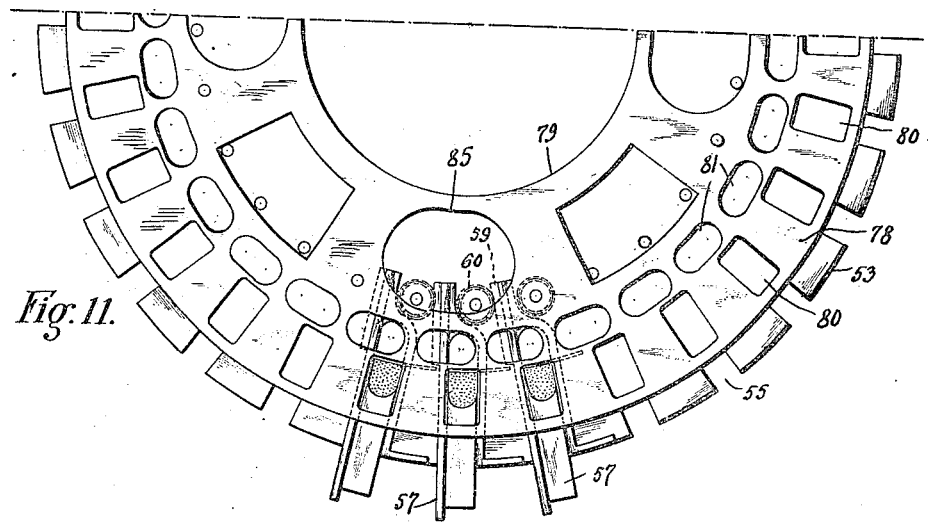
Figure 12:
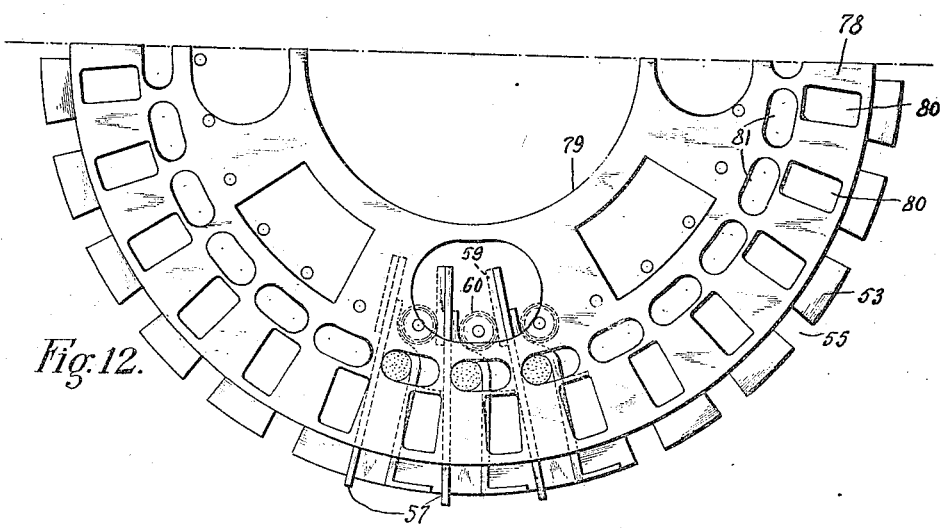
Figure 13:
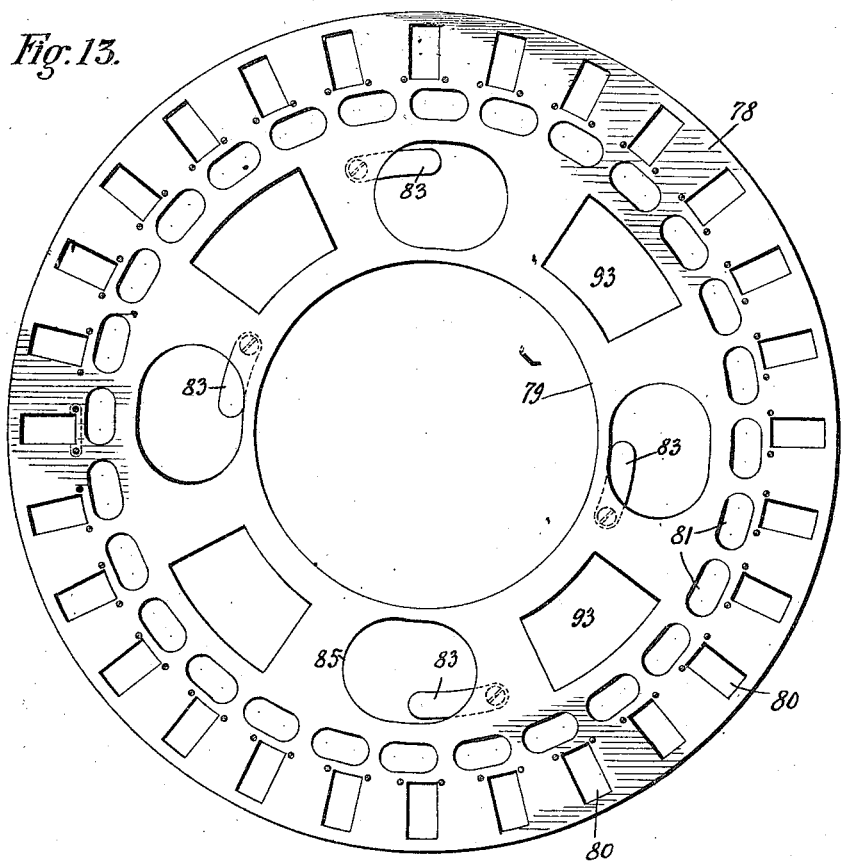
Figure 14:
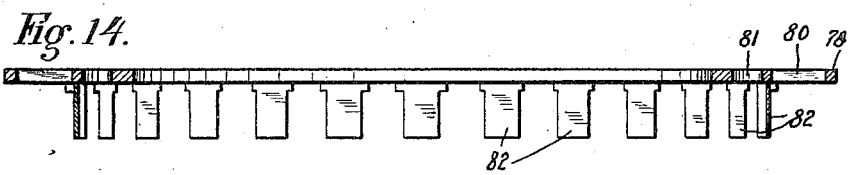
Figures 15, 16:
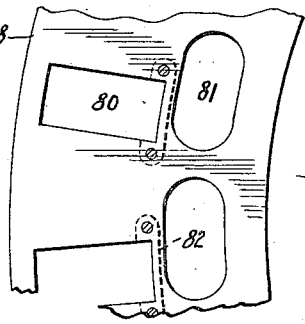

Figure 1 is a side elevation of a machine constructed in accordance with the present invention; Fig. 2 is a bottom plan view, on a larger scale, of part of the driving mechanism of the machine; Fig. 3 is a bottom plan view complementing Fig. 2; Fig. 4 is a side elevation, partly in section, on a larger scale of the lower portion of the machine; Fig. 5 is a section taken on line 5—5 of Fig. 4; Fig. 6 is a vertical section, on a larger scale, taken through the charging mechanism of the machine; Figs. 7 and 8 are similar sections showing certain elements of the charging mechanism in positions other than those shown in Fig. 6; Fig. 9 is a top plan view, on a larger scale, of the charging mechanism; Fig. 10 is a side elevation of the device shown in Fig. 9, certain elements being removed; Figs. 11 and 12 are elevations similar to that shown in Fig. 9, with certain elements in other positions; Fig. 13 is a top plan view of an element of the charging mechanism; Fig. 14 is a central vertical section taken through said element; Fig. 15 is a top plan view, on a larger scale, of a portion of the element shown in Figs. 13 and 14; Fig. 16 is a side elevation of the element shown in Fig. 15; Fig. 17 is an elevation, partly in section, of the plunger carrying mechanism; Figs. 18 and 18ᵃ are elevations similar to the one shown in Fig. 17, in combination with the plunger-control setting devices; Figs. 19 and 19ᵃ are front elevations of the constructions shown in Figs. 18 and 18ᵃ; Fig. 20 is a side elevation, on a larger scale, of a portion of a plunger and a control mechanism co-operating therewith; Fig. 21 is a front elevation of the detail shown in Fig. 20; Fig. 22 is an elevation similar to the one shown in Fig. 20 with certain elements of the control mechanism in other positions; Fig. 23 is a front elevation, on a larger scale, of a portion of the plunger resetting device; and Fig. 24 is a top plan view of the detail shown in Fig. 23.

In the drawings, the numeral 25 indicates a base, from which rises a hollow vertical column 26. This column is, preferably, provided with a horizontal flange 27 at its bottom, the said flange resting on the said base and being fixed thereto, for instance, by screw bolts 28. On the said flange are formed roller bearings 29, supporting a turret 30, which is concentric with the said column and is adapted to rotate in relation to the said column, as will hereinafter appear. The turret includes two spaced disks 31, having registering equidistantly disposed peripheral notches 32 into which the tubes or molds 33 are inserted, the latter resting in vertical positions on the bottom member 34 of the turret and being held in position in any suitable manner. Continuous rotary motion is imparted to the turret from the main driving shaft 35 of the machine, said shaft being mounted in bearings 36 on the base and having keyed or otherwise attached to it a pulley 37, to which motion may be imparted from any suitable source of power. To the driving shaft is fixed a pinion 38, in mesh with a gear 39 on a crank shaft 40, the last-mentioned shaft being journaled in bearings 41 on the base and carrying a bevel gear 42, in mesh with a similar gear 43 on a shaft 44. The shaft 44 is journaled in bearings 45 on the base 25 and has formed thereon a worm 46, meshing with a worm gear 47, that is fixed to the turret 30.

The turret has at its upper end a disk 48, provided adjacent its periphery with equidistantly spaced circular ports 49, in alignment with the notches 32 in the disks 31, the tubes or molds extending to the underface of the disk 48, so that the comminuted cork, treated as above stated, may be fed into the molds from a hopper 50 of any suitable configuration. This hopper comprises an outer shell 51, with which is concentrically arranged an inner shell 52, the latter surrounding the column 26. The hopper is attached, as will hereinafter appear, to the turret, thus rotating with the said turret. The material is fed into the hopper from a stationary chute, not shown, so that the comminuted cork is evenly distributed in the hopper. Between the bottom of the hopper and the disk 48 is interposed a charging mechanism. This mechanism comprises a disk 53, having a central opening 54, through which the column 26 extends. This last-mentioned disk is spaced from the disk 48 and is provided with equidistantly spaced radial slots 55, of which there are as many as there are ports 49 in the disk 48, the said slots registering with the said ports. The disk 53 is attached to the turret, so as to rotate therewith. The attaching means will be described hereinafter. From each slot 55 extends laterally a slot 56, (Fig. 9). With each slot 55 is associated a slide 57, adapted to move radially below the disk 53 in guides 58 on the latter. Each slide is provided with a rack 59, the teeth of which mesh with a pinion 60. The pinions are rotatably mounted on the disk 48 (Fig. 6). The guides and slides are each of a height corresponding to the distance between the upper face of the disk 48 and the upper face of the disk 53, so that chambers are formed into which material flows from the hopper, to be fed by the said slides through the ports 49 into the tubes or molds. The pinions 60 mesh with a ring gear 61. This gear is mounted on the disk 48 and it is adapted to oscillate thereon, as will hereinafter appear.

The means which impart oscillating movement to the ring gear 61 includes a gear 62, keyed to the shaft 44 and in mesh with a gear 63 on a shaft 64. This last-mentioned shaft is rotatable in hanger bearings 65, depending from the underface of the top plate of the base 25. To the shaft 64 is fixed a bevel pinion 66, in mesh with a bevel gear 67 on a vertical shaft 68. The shaft 68 extends into the column 26 and is suitably journaled in bearings on the base 25. To the shaft 68 is keyed a pinion 69, meshing with internal teeth 70 of a ring gear 71, the pinion 69 extending through a slot 72 in the column 26. The ring gear is adapted to rotate with the mold supporting turret and is provided with external teeth 73, with which mesh four pinions 74. These pinions are each keyed to a vertical shaft 75, the said shafts being rotatably mounted on the turret. Each of the shafts 75 has fixed to it a cam 76, adapted to co-operate with lugs 77 on the ring gear 61. The cams are so shaped that two of the same cause an oscillating movement of the ring gear 61 in one direction and the other two in the other direction, thereby imparting to the slides 57 in their guides a reciprocating motion. These slides are caused to move inwards after all plungers have been disengaged from the molds, thereby charging the said molds with comminuted cork and to move outwards while the plungers compress the charges in the molds.

With the feeding slides co-operates a shutter mechanism. This mechanism includes a disk 78, which is placed on top of the disk 53, it being provided with a central opening 79, through which the column 26 extends. The shutter disk is provided with radial slots 80, adapted to be brought into alignment with the slots 55 in the disk 53. It is furthermore provided with arc-shaped slots 81, which are in alignment with the slots 55. Adjacent the inner ends of each slot 80 is mounted on the shutter disk a downwardly extending plate member 82, the said plate members being adapted to move into the slots 56 in the disk 53. The shutter disk is adapted to oscillate in relation to the disk 53, and it is for this purpose provided with four lugs 83, with which are adapted to co-operate cams 84 on the four vertical shafts 75. Two of these cams cause a movement of the shutter disk in one direction and the other two a movement in the opposite direction. The cams are so timed that, when the slides 57 are in their outer positions (Fig. 11), the radial slots 80 in the shutter disk are caused to register with the slots 55 in the disk 53 and the plates 82 prevent the comminuted cork from flowing from the charging chambers toward the ports 49 in the disk 48. On the other hand, when the radial slots 80 in the shutter disk are brought out of alignment with the slots 55 in the disks 53, the plate members 82 move into the slots 56 in the disk 53, thereby permitting the slides, on their inward movement, to cause the comminuted cork to move through the ports 49 in the disk 48 into the tubular molds. The lugs 83 project into openings 85 in the shutter disk, which openings must obviously be large enough to allow of an oscillating movement of the said shutter disk in relation to the shafts 75.

On top of the shutter disk is placed an agitating device in the form of a disk 86, provided with a central opening 87, through which the column 26 extends. On this disk are provided radial fingers 88, extending across the radial slots 80 in the shutter disk. The agitating disk is oscillatable on the shutter disk and it is for this purpose provided with four lugs 89, with which co-operate cams 90 on the vertical shafts 75. Two of these cams cause the agitating disk to move in one direction and the other two in the other direction. It is obvious that, when the plungers are about to descend into the molds, the agitating fingers must be out of alignment with the ports 49 in the disk 48.

The hopper may be secured directly to the disk 53, and the connection between this last-mentioned disk and the turret may be made by two vertical bars 91, which extend through openings 92 in the disk 53 a substantial distance above the hopper, as clearly shown in Fig. 1 of the drawings. These bars extend also through openings 93 in the shutter disk and through openings 94 in the agitator plate, the openings 93 and 94 being considerably wider than the bars 91, to permit the shutter disk and agitator plate to oscillate in relation to the bars 91.

Upon the upper portion of the column 26 is vertically reciprocable a head 95, which is caused to rotate with the turret 30, the connection being made by the bars 91 extending through openings 96 in the said head. In the head are slidably mounted plungers 97, the said plungers being in alignment with the ports 49 in the turret. The head is actuated from the shaft 40, there being formed on the latter a crank 98, joined by a connecting rod 99 with one end of a beam 100, which is fulcrumed at 101 to a standard 102, rising from the base 25. The other end of this beam extends through a vertical slot 26′ into the column 26, and is connected by a link 103 in said column with a horizontally extending shaft 104, which extends through longitudinal slots 105 in the column into an annular recess 106 in the inner face of the head. The ends of the shaft 104 are mounted in roller bearings 107, which are disposed within the said recess. On the shaft 104 are formed guide blocks 108, which are partly disposed within the slots 105. It is obvious that this connection between the head and the crank 98 permits of a rotary motion of the said head with the turret while the said head is being moved to and from the said turret.

Each plunger 97 is provided at its lower end with an enlargement 109, which is slightly less in diameter than the inner diameter of a tubular mold 33. Each plunger is provided longitudinally with two sets of ratchet teeth 110 and 111, the teeth of one series running in a direction opposite to those of the other series, as clearly appears from Figs. 17 to 22, inclusive, of the drawings. With the teeth 110 of each plunger co-operates a pawl 112. This pawl is provided with a longitudinal slot 113, through which extends a pin 114 on a support 115, the support being carried by the head 95. The teeth 110 are so formed that the plunger is permitted by the pawl 112 to move downwards, but not upwards. With the teeth 111 of each plunger co-operates a pawl 116, extending in a direction opposite to that of the respective pawl 112, the pawl 116 being mounted upon a pin 117 on the support 115. The pawl 116 permits the plunger to move upwards, but not downwards. The pawl 116 has an extension 118, in which are formed two notches 119 and 120, co-operating with a latch 121 in the form of a bellcrank lever, that is fulcrumed at 122 to the support 115. The shorter arm 123 of this bellcrank lever is adapted to co-operate with the notches 119 and 120, and the longer arm 124 of the bellcrank lever is adapted to co-operate with setting means 125 and 126 (Figs. 18 and 18ª), as will hereinafter appear. The setting means 125 is fixed to a stationary ring 127, it being disposed a little distance below the said ring. The setting means 126 is also fixed to the said ring, but is disposed a substantial distance below the said ring. The ring extends horizontally, it encircling the column 26 and being attached to a bracket 128 on the standard 102. The inner face 129 of the ring 127 is conical, it co-operating with the pawls 112 above described.

Above the ring 127 is attached to the column 26 a bracket 130 provided with vertical bearing points 131, on which is adapted to oscillate a block 132, to which is fixed a downwardly extending member 133, having a lateral extension 134 in the path of the plungers. A spring 135, fixed to the bracket 130 and the block 132, has a tendency to move the latter against a fixed abutment 136. When, on the upward movement of the head 95, the upper end of a plunger is brought against the extension 134, which forms a stop, the upward end of the movement of the plunger is arrested, and, if, as will be hereinafter described, the respective pawl 116 has been disengaged from the teeth 111 of the said plunger, the latter is caused by the stop 134 to move downwards. The stop 134 is adapted to turn with the plunger, the spring 135 returning the said stop to its normal position, in which it bears against the abutment 136, after the plunger has been disengaged therefrom.

The operation of this device is as follows: As stated above, the plunger carrying head 95 rotates with the mold supporting turret, so that each plunger cooperates at all times with the same port 49 in the disk 48. Each plunger enters the mold co-operating therewith to a successively decreasing extent during each downward movement of the plunger as successive charges are compressed therein, so that with each complete revolution of the mold supporting turret a plunger completely fills the mold co-operating therewith, the filled mold being removed by the operator and replaced by an empty one. Inasmuch as the operation of all plungers and charging devices is the same, the description of the operation of only a single plunger and a single charge forming device seems to be necessary. The turret rotates in the direction of the arrow shown in Fig. 2 of the drawings. The complete molds are removed from the turret immediately in front of the pawl setting means 125 and 126, and the empty molds are placed on the turret in rear of the said setting means. When a filled mold is removed from the turret, obviously the plunger co-operating therewith is in its highest position on the head 95. In the normal operation of a plunger, the pawls 112 and 116 are in the positions shown in Fig. 20 of the drawings. When the plunger, in its highest position on the head 95, arrives at the pawl setting means 126 and the head 95 descends, the longer arm 124 of the latch 121, in striking the setting means 126 (Fig. 18ª) is shifted from the position shown in Fig. 20 of the drawings into the position shown in Fig. 22, the shorter arm 123 of the said latch being disengaged from the notch 119 in the extension 118 of the pawl 116 and seated in the notch 120 therein, the elements being then in the positions shown in Fig. 22, from which it appears that the pawl 116 has been disengaged from the ratchet teeth 111 of the plunger. As the head with the plunger ascends, the upper end of the plunger, in the continued rotation of the head, is brought to bear against the stop 134, which forces the plunger into its lowermost position on the head 95. When the head then ascends, the longer arm 124 of the latch 121 strikes the pawl setting means 125, whereby the said latch is disengaged from the notch 120 in the extension of the pawl 116, so that the pawl is adapted to drop by gravity into the engagement with the teeth 111, the shorter arm 123 being seated in the notch 119 in the extension, the elements being then again in the position shown in Fig. 20 of the drawings. Whenever the head reaches its uppermost position, the upper end of the pawl 112 bears against the inner face of the ring 127, whereby the said pawl is swung around its pivot 114 and disengaged from the teeth 110 of the plunger. When the plunger then starts its downward movement the pawl 112 moves downwards as far as its slot 113 permits, the lower end of the pawl being thus brought into engagement with the next tooth in the series. The plunger is thus permitted to be raised a distance corresponding to the length of an individual tooth 110, or in other words as far as the slot 113 permits, the plunger in rising lifting the pawl 112 and being stopped in its upward movement by the lower end of the slot 113 abutting against the pivot pin 114.

When the head 95 rises and the plunger clears the unfilled mold, a measured quantity of prepared comminuted cork is fed into the mold by the respective slide 57, the slide being brought from the position shown in Fig. 11 of the drawings into the position shown in Fig. 12. It is to be noted that during the time that the slide moves inwards to feed the cork through the port 49 into the mold, the shutter disk 78 is in the position shown in Fig. 12 of the drawings, in which it prevents cork from flowing from the hopper into the chamber formed by the slide guides, the slide and the disk 48. During the downward stroke of the plunger the charge within the mold is compressed, the plunger rising, as above stated, a distance corresponding to that of the length of an individual tooth 110. The head and the plunger thereupon ascends, its pawl 112 being set by the ring 127 in a manner above set forth, a measured quantity of cork is again fed into the mold and the cycle of operation repeated. This operation continues until the mold arrives in front of the setting means 125 and 126, by which time it is fully filled and a cork rod formed therein. The filled mold is removed by the operator, the setting means 125 and 126 and the stop 134 acting in the manner above described to restore the plunger to its lowermost position in relation to the head 95, to start again its operation above described in conjunction with an empty mold that has been placed upon the turret or mold support by the operator.

Inasmuch as the plungers arrive one after the other at the stop 134, they are lowered one after the other in the manner above described, so that the plungers are carried at graduated heights in relation to the head 95, as clearly appears from Fig. 1 of the drawings, the result being that with each down stroke of the head 95 a cork rod is completed. It is obvious that, when first starting the machine with a complete set of molds thereon, the first molds, save one, during the first revolution of the machine will contain the composition cork unpacked or partially packed. Thereafter, however, each descent of the plunger carrying head 95 will, as a result of the differential movement of the various plungers, result in the completion of one completely packed mold, the packing of which has been accomplished in as many uniform stages as there are ratchet teeth 110 on an individual plunger, each stage consisting in the packing of a fixed, measured quantity of the cork composition through a fixed, definite pressing movement of a plunger. Rods of uniform density throughout are thus produced.

Inasmuch as each plunger co-operates with the same mold through the entire filling process, it is obvious that the provision of aligning devices is unnecessary. It is also obvious that, inasmuch as the plungers rotate with the mold supporting turret and these elements rotate continuously, shocks and jars are avoided. It is to be noted that, by reason of the continuous rotation of the machine, the time of producing the rod is considerably shorter than with the machines heretofore in use, all of which operate intermittently.

What I claim is:

1. A machine of the character described comprising a continuously moving support for a plurality of tubular molds, a plurality of plungers traveling with said support and adapted to enter the molds, means to feed charges to each of the molds, means for causing said plungers to enter the molds subsequent to the operation of said feeding means, and means whereby the extent of movement of said plungers progressively decreases within the molds.

2. A machine of the character described comprising a continuously rotating support for a plurality of tubular molds, a plurality of plungers traveling with said support and adapted to enter the molds, means to feed charges to each of the molds, means for causing said plungers to enter the molds subsequent to the operation of said feeding means, and means whereby the extent of movement of said plungers progressively decreases within the molds.

3. A machine of the character described comprising a continuously moving support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, and means whereby the extent of movement of said plungers progressively decreases within the molds.

4. A machine of the character described comprising a continuously rotating support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, and means whereby the extent of movement of said plungers progressively decreases within the molds.

5. A machine of the character described comprising a continuously moving support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, and means whereby the extent of movement of said plungers progressively decreases within the molds.

6. A machine of the character described comprising a continuously rotating support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, and means whereby the extent of movement of said plungers progressively decreases within the molds.

7. A machine of the character described comprising a continuously moving support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, and means whereby the extent of movement of said plungers progressively decreases within the molds.

8. A machine of the character described comprising a continuously rotating support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, and means whereby the extent of movement of said plungers progressively decreases within the molds.

9. A machine of the character described comprising a continuously moving support for a plurality of tubular molds, a plurality of plungers traveling with said support and adapted to enter the molds, means to feed charges to each of the molds, means for causing said plungers to enter the molds subsequent to the operation of said feeding means, means whereby the extent of movement of said plungers progressively decreases within the molds, and means for restoring each plunger to its initial position after it has reached its smallest extent of movement within a mold.

10. A machine of the character described comprising a continuously rotating support for a plurality of tubular molds, a plurality of plungers traveling with said support and adapted to enter the molds, means to feed charges to each of the molds, means for causing said plungers to enter the molds subsequent to the operation of said feeding means, means whereby the extent of movement of said plungers progressively decreases within the molds, and means for restoring each plunger to its initial position after it has reached its smallest extent of movement within a mold.

11. A machine of the character described comprising a continuously moving support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, means whereby the extent of movement of said plungers progressively decreases within the molds, and means for restoring each plunger to its initial position after it has reached its smallest extent of movement within a mold.

12. A machine of the character described comprising a continuously rotating support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, means whereby the extent of movement of said plungers progressively decreases within the molds, and means for restoring each plunger to its initial position after it has reached its smallest extent of movement within a mold.

13. A machine of the character described comprising a continuously moving support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring each plunger to its initial position after it has reached its smallest extent of movement within a mold.

14. A machine of the character described comprising a continuously rotating support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, whereby the extent of movement of said plungers progressively decreases within the molds, and means for restoring each plunger to its initial position after it has reached its smallest extent of movement within a mold.

15. A machine of the character described comprising a continuously moving support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring each plunger to its initial position after it has reached its smallest extent of movement within a mold.

16. A machine of the character described comprising a continuously rotating support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring each plunger to its initial position after it has reached its smallest extent of movement within a mold.

17. A machine of the character described comprising a continuously moving support for a plurality of tubular molds, a plurality of plungers traveling with said support and adapted to enter the molds, means to feed charges to each of the molds, means for causing said plungers to enter the molds subsequent to the operation of said feeding means, means whereby the extent of movement of said plungers progressively decreases within the molds, and means for restoring said plungers in succession to their initial positions in the order which and after they have reached their smallest extent of movement within the molds associated therewith.

18. A machine of the character described comprising a continuously rotating support for a plurality of tubular molds, a plurality of plungers traveling with said support and adapted to enter the molds, means to feed charges to each of the molds, means for causing said plungers to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

19. A machine of the character described comprising a continuously moving support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

20. A machine of the character described comprising a continuously rotating support for a plurality of tubular molds, a plurality of plungers traveling with said support and adapted to enter the molds, means to feed charges to each of the molds, means for reciprocating said plungers so as to cause the same to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

21. A machine of the character described comprising a continuously moving support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

22. A machine of the character described comprising a continuously rotating support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

23. A machine of the character described comprising a continuously moving support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

24. A machine of the character described comprising a continuously rotating support for a plurality of tubular molds, a head moving with said support and reciprocable in relation thereto, a plurality of plungers slidably arranged on said head and adapted to enter the molds, means to feed charges to each of the molds, means for reciprocating said head to cause said plungers to enter the molds subsequent to the operation of said feeding means, means whereby the extent of movement of said plungers progressively decreases within the molds, and means for restoring said plungers in succession to their initial positions in the order in which and after they have reached their smallest extent of movement within the molds associated therewith.

25. A machine of the character described comprising a continuously moving support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, means whereby the extent of movement of each individual plunger progressively decreases within the mold co-operating therewith, and means acting in succession on said plungers whereby the entire series of plungers enters the molds at each stroke of said head with a progressively decreasing extent of movement relative to one another.

26. A machine of the character described comprising a continuously rotating support for a plurality of tubular molds, a head moving with said support and reciprocable in relation thereto, a plurality of plungers carried by said head and adapted to enter the molds, means to feed charges to each of the molds, means for reciprocating said head to cause said plungers to enter the molds subsequent to the operation of said feeding means, means whereby the extent of movement of each individual plunger progressively decreases within the mold co-operating therewith, and means acting in succession on said plungers whereby the entire series of plungers enters the molds at each stroke of said head with a progressively decreasing extent of movement relative to one another.

27. A machine of the character described comprising a continuously moving support for a plurality of tubular molds, a head moving with said support and reciprocable in relation thereto, a plurality of plungers slidable upon said head and adapted to enter the molds, means to feed charges to each of the molds, means for reciprocating said head to cause said plungers to enter the molds subsequent to the operation of said feeding means, means whereby the extent of movement of each individual plunger progressively decreases within the mold co-operating therewith, and means acting in succession on said plungers whereby the entire series of plungers enters the molds at each stroke of said head with a progressively decreasing extent of movement relative to one another.

28. A machine of the character described comprising a continuously rotating support for a plurality of tubular molds, a head moving with said support and reciprocable in relation thereto, a plurality of plungers slidable upon said head and adapted to enter the molds, means to feed charges to each of the molds, means for reciprocating said head to cause said plungers to enter the molds subsequent to the operation of said feeding means, means whereby the extent of movement of each individual plunger progressively decreases within the mold co-operating therewith, and means acting in succession on said plungers whereby the entire series of plungers enters the molds at each stroke of said head with a progressively decreasing extent of movement relative to one another.

29. A machine of the character described comprising a support for a tubular mold, a plunger reciprocable in relation to said support and adapted to enter the mold, means to feed charges to the mold, means for causing the plunger to enter the mold subsequent to the operation of said feeding means, two sets of oppositely running ratchet teeth disposed longitudinally on said plunger, a pawl co-operating with each set of ratchet teeth, and means cooperating with one of said pawls for causing said plunger to enter the mold with a progressively decreasing extent of movement during each inward stroke of said plunger.

30. A machine of the character described comprising a support for a tubular mold, a head reciprocable in relation to said support, a plunger slidably arranged upon said head, means to feed charges to the mold, means for reciprocating said head to cause said plunger to enter the mold, two sets of oppositely running ratchet teeth disposed longitudinally on said plunger, two pawls carried by said head co-operating with said ratchet teeth, and means co-operating with one of said pawls for causing said plunger to enter the mold with a progressively decreasing extent of movement during each inward stroke of said head.

31. A machine according to claim 30, comprising means for disengaging the other one of said pawls from its set of teeth when said plunger has reached its smallest extent of movement within the mold, means for restoring said plunger thereafter to its initial position on said head, and means for causing said last-mentioned pawl after said restoration to engage the set of teeth co-operating therewith.

32. A machine of the character described comprising a continuously moving support for a plurality of tubular molds, a corresponding plurality of material receiving pockets mounted upon and moving with said support, each pocket being provided with a port in alignment with a tube on said support, a hopper arranged to deliver material to said pocket, means for transferring the material from said pockets to the tubes, and means for cutting off the supply from said hopper to said pockets while the material in said pockets is transferred to the molds.

33. A machine according to claim 32, comprising a plurality of plungers adapted to enter the chambers to compress material therein, and means for closing the communication between said pockets and the molds while said plungers are within the molds.

Signed at Brooklyn, in the county of Kings and State of New York, this 28th day of July, A. D. 1925.

JOHN BINDER.